United States Patent
Jensen, deceased

[15] 3,693,188
[45] Sept. 19, 1972

[54] READ-OUT AND RESET CONTROL FOR A MEMORY CORE

[72] Inventor: James L. Jensen, deceased, late of 4505 Andover Rd., Edina, Minn. Gillian C. Jensen, administratrix

[22] Filed: May 7, 1971

[21] Appl. No.: 141,329

[52] U.S. Cl. .............................................. 340/174 R
[51] Int. Cl. ................................................ G11c 7/00
[58] Field of Search ....................... 340/174; 307/88

[56] References Cited

UNITED STATES PATENTS 3,146,381   8/1964   Moreau .................. 340/174 R

Primary Examiner—James W. Moffitt
Attorney—Lamont B. Koontz and Omund R. Dahle

[57] ABSTRACT

A flux to period generator for reading out a preset predetermined flux level stored in a core and for resetting said core to said predetermined flux level embodying a first means to determine the length of time necessary to saturate said core from the predetermined level to thereby indicate the level of flux which was preset into the core and a second means to reset said core to its predetermined flux level.

9 Claims, 2 Drawing Figures

PATENTED SEP 19 1972  3,693,188

INVENTOR:
JAMES L. JENSEN, DECEASED
BY GILLIAN C. JENSEN,
ADMINISTRATIX.

BY Omund R. Dahle
ATTORNEY.

READ-OUT AND RESET CONTROL FOR A MEMORY CORE

In certain systems it is desirable to store a predetermined flux level in a permanent magnet. It becomes necessary to read-out the flux level stored in this permanent magnet without destroying that flux level. There has been a need in prior art systems for a mechanism by which the flux level stored in a permanent magnet core could be read out and the core then reset to the predetermined flux level existing in the core just prior to the read-out operation.

The invention disclosed herein fulfills this need by providing a system to read out the predetermined flux level stored in a core and to reset that core to the predetermined flux level existing in the core prior to the read-out operation. Moreover, by the invention disclosed herein, successive read-outs can be effectuated without appreciably changing the flux level of the core.

Therefore, it is an object of the invention to provide a system for reading out a predetermined flux stored in a core and for resetting that core to the original flux level and for maintaining that predetermined flux level regardless of the number of read-out and reset operations performed on said core.

This and other objects will become apparent as the description of the invention progresses.

IN THE DRAWINGS

DESCRIPTION OF THE PREFERRED EMBODIMENT

Figure 1:
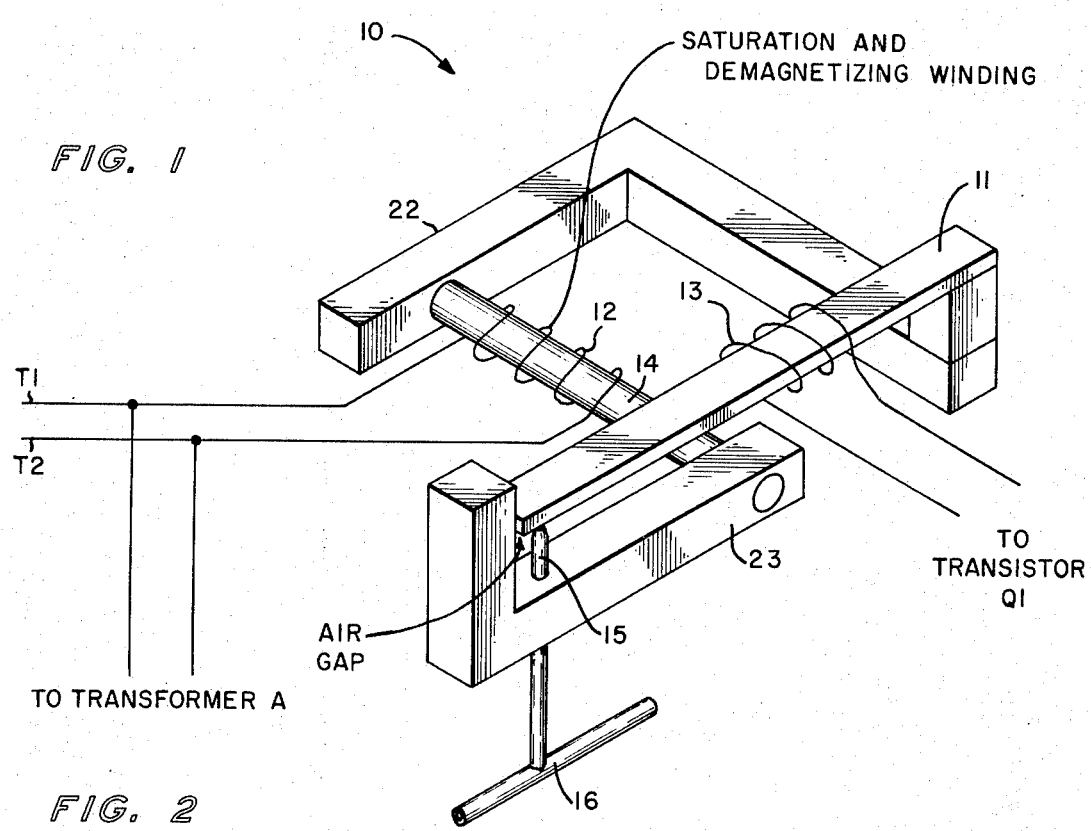
FIG. 1 is a diagrammatic representation of one of the uses to which this invention is applicable.

In FIG. 1, A system shown generally at 10, is disclosed whereby a setpoint can be established in a pneumatic system. The system comprises a magnetostrictive element 11 the dimensions of which change in response to applied magnetic fields. The magnetic field is initially applied by a saturation and demagnetizing winding 12 wound around a permanent magnet 14. The magnetostrictive element 11 and permanent magnet 14 form a portion of a magnetic core. This core further comprises ferrite elements 22 and 23 which connect the permanent magnet 14 to the magnetostrictive element 11. The core is constructed such that an air gap exists between the magnetostrictive element 11 and ferrite element 23. By properly energizing the winding 12, a flux can be stored in the permanent magnet 14 which will cause the magnetostrictive element 11 to position itself at a certain distance from nozzle 15 of a pneumatic source 16. Due to the flux stored in the permanent magnet 14, magnetostrictive element 11 will hold that position.

The position of the element 11 with respect to the nozzle 15 will determine the pressure in the output side of a pneumatic line 16. Such pressure can be used to establish a setpoint in a pneumatic sensor.

The predetermined flux level is stored in a permanent magnet 14 by first saturating the permanent magnet 14 via a saturation signal applied to terminals T1 and T2 connected to winding 12 and then energizing the winding 12 in an opposite direction to desaturate permanent magnet 14 to the desired flux level.

Winding 13 is wound around the magnetostrictive element 11 and produces a voltage there across due to flux changes in the core comprising magnetostrictive element 11, permanent magnet 14 and ferrite members 22 and 23.

Although a specific example has been shown wherein a predetermined flux level can be stored in a core, it is to be stressed that the invention disclosed herein is not limited to the current to pressure transducer shown in FIG. 1. The invention disclosed herein has general application to any system wherein a flux level is to be permanently stored in a core and read out at a later time and wherein the original flux level stored in that core is to be subsequently reset.

Figure 2:
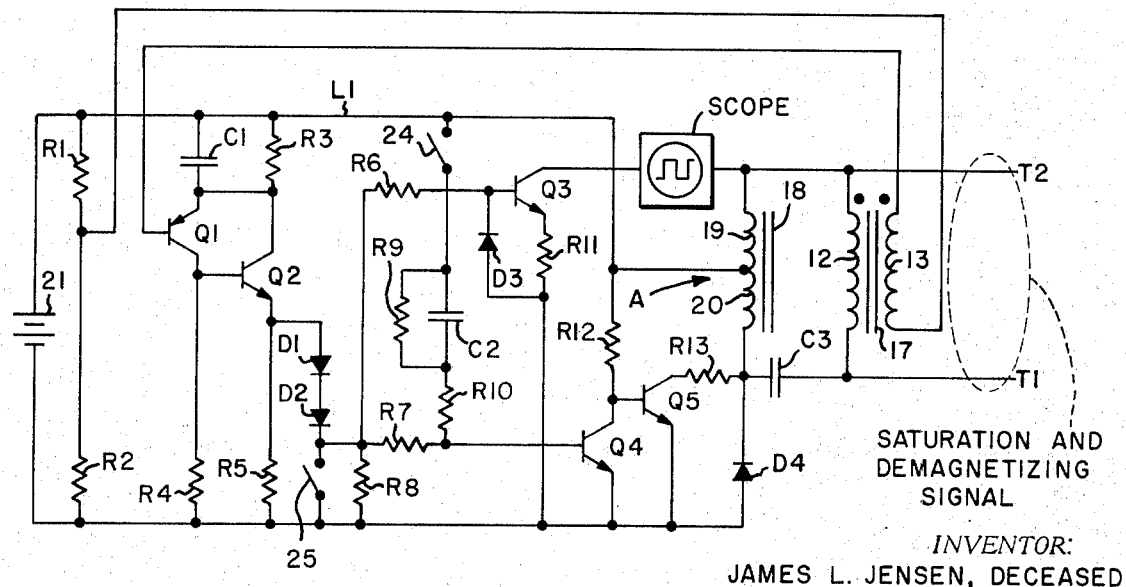
FIG. 2 is a schematic drawing of the read-out and reset circuitry.

In FIG. 2, there is shown the specific circuitry to carry out the read-out and reset operations disclosed herein. The read-out operation will indicate the flux level stored in the core. Since the flux level bears a direct relation with the setpoint pressure (FIG. 1), that setpoint can thus be determined.

In FIG. 2 is shown a DC source 21 connected to supply lines L1 and L2. Connected across lines L1 and L2 is a voltage divider comprising resistors R1 and R2. The junction of resistors R1 and R2 is connected to one side of sensing winding 13 the other side of which is connected to the base of PNP transistor Q1. The emitter of Q1 is connected through the parallel combination of capacitor C1 and resistor R3 to the line L1. The collector of Q1 is connected through resistor R4 to line L2 and, also, is connected to the base of PNP transistor Q2 the collector of which is connected to the junction of the emitter of transistor Q1 and the parallel combination of capacitor C1 and resistor R3. The emitter of transistor Q2 is connected to line L2 through a resistor R5.

The emitter of transistor Q2 is connected through diodes D1 and D2 first through a resistor R6 to the base of NPN transistor Q3, second through a resistor R7 to the base of NPN transistor Q4, and third through resistor R8 to line L2. A start switch 24 connects line L1 to the base of transistor Q4 through a pulse forming circuit consisting of the parallel combination of capacitor C2 and resistor R9 in series with a resistor R10. The collector of transistor Q4 is connected through a resistor R12 to line L1 whereas the emitter of transistor Q4 is connected directly to line L2. The emitter of transistor Q3 is connected to one side of a resistor R11 the other side of which is connected to the base of Q3 through a clamping diode D3 and, also, to line L2. The collector of transistor Q3 is connected through a scope, or any meter which can read the time during which transistor Q3 is conducting, to an autotransformer A comprising windings 19 and 20.

The tap of this transformer is connected to the top of resistor R12, and the bottom of the transformer is connected through a resistor R13 to the collector of NPN transistor Q5 the emitter of which is directly connected to line L2. The base of transistor Q5 is connnected to the junction of resistor R12 and the collector of transistor Q4. Connected between line L2 and the junction of the transformer A and resistor R13 is a clamping diode D4. The transformer is wound around a normally saturated core 18. A capacitor C3 connects the transformer across the saturation and demagnetizing winding 12 wound around core 17. Core 17 represents the magnetic structure of FIG. 1 comprising permanent magnet 12, magnetostrictive element 11 and ferrite elements 22 and 23. Also wound around the core 17 is the sensing winding 13. The circuit disclosed in FIG. 2 is designed to read out that flux level and to reset core 17 to the flux level existing therein prior to the read-out operation.

In discussing the operation of the circuit, it must first be noted that switch 24 is normally open and transistors Q1-Q4 are normally nonconducting. Since transistor Q4 is normally nonconducting, transistor Q5 is normally conducting and saturating current is supplied to the winding 20 through transistor Q5 and resistor R13. Since the core 18 is saturated such that the flux therein is not changing, no output voltage is produced by the transformer and, thus, no voltage is produced across the winding 12.

The manner in which the predetermined flux level is stored in the core 17 was described with respect to FIG. 1. The magnetizing and desaturating signal is applied to terminals T1 and T2. During this preset operation, the flux in a core 17 is changing thus producing a voltage across the sensing winding 13 which produces an energizing signal for transistors Q1 and Q2. Thus, it may be convenient to provide some means by which transistors Q3, Q4 and Q5 can be held in their normal states even though Q1 and Q2 are momentarily rendered conductive. These normal states can be maintained by providing a short across resistor R8, as by closing normally open switch 25, during the initial saturation and demagnetization of core 17.

Since no voltage is produced either across transformer A because of the saturation of core 18 or across terminals T1 and T2, the flux in core 17 is unchanging and no voltage appears across winding 13. Therefore, while a predetermined flux level is stored in core 17, transistor Q1 and Q2 are nonconductive.

The read-out operation is begun by momentarily closing switch 24 which supplies a pulse through the pulse forming network comprising resistors R9 and R10 and capacitor C2 to the base of transistor Q4 energizing that transistor into conduction. The conduction of transistor Q4 shorts the base emitter circuit of Q5 rendering that transistor nonconductive and cutting off the saturating current supplied to the winding 20. The core flux of core 18 begins to collapse inducing a voltage across transformer A. This voltage is applied across the saturation and demagnetizing winding 12 changing the flux level of core 17 in a direction toward saturation. The change in the flux in core 17 induces a voltage across sensing winding 13 which is applied to the base of transistor Q1 to render that transistor conductive. When transistor Q1 conducts, base drive current is applied to transistor Q2 rendering that transistor conductive. When transistor Q2 conducts, current is supplied both through diodes D1 and D2 to the base of transistor Q4 to maintain that transistor in conduction and thus maintain transistor Q5 nonconductive and also to the base of transistor Q3. Conduction of transistor Q3 serves to supply a reverse voltage to winding 19 to thus maintain the flux excursion of core 18 begun when transistor Q5 was turned off.

Winding 13 maintains transistor Q1 conducting until core 17 saturates. When core 17 saturates, the flux in core 17 no longer changes. Therefore, voltage is no longer induced in winding 13 such that the turn on signal for transistor Q1 ceases and transistors Q1 and Q2 begin to turn off which turns off transistors Q3 and Q4.

The time during which transistor Q3 conducts is a measure of the amount of time it takes to saturate the core 17. This time is a direct function of the initial flux level of the core 17. Thus, by measuring the time during which transistor Q3 conducts, the predetermined flux levels stored in core 17 may be determined.

The reset operation, which occurs automatically after the read-out operation, begins when transistors Q3 and Q4 turn off rendering transistor Q5 conductive to again apply saturating current to the winding 20. This saturation current drives core 18 into saturation and, because of the changing flux in core 18 induces a voltage across the transformer which is applied across saturation and demagnetizing winding 12 in such a direction as to drive core 17 out of saturation. Desaturating current will be supplied to winding 12 only for so long as core 18 remains unsaturated. As soon as core 18 saturates, voltage is no longer induced in the transformer and is, therefore, no longer applied to winding 12. Therefore, core 17 ceases desaturation at the flux level existing in core 17 prior to the read-out operation. Since the positive voltage time integral, i.e. the time necessary to bring core 17 up to saturation and thus to bring core 18 out of saturation is equal to the negative voltage time integral, i.e. the time necessary to resaturate core 18 and thus to bring core 17 out of saturation to its predetermined flux level established prior to the read-out operation, the flux level in core 17 prior to the read-out operation will be re-established in that core. The flux change in one direction is nullified by an equal flux change in the opposite direction.

The time necessary to perform the read-out and reset operations is so slight that the movement, if any, of the magnetostrictive element is imperceptible.

Diodes D1 and D2 are incorporated in the circuit to insure that the output signal provided by transistors Q1 and Q2 reaches a certain level before transistors Q3 and Q4 can conduct. Consequently, noise and line disturbances do not cause false triggering of the read-out circuit.

As changes can be made in the above-described construction and many apparent different embodiments of this invention can be made without parting from the scope thereof, it is intended that all matter contained in the above description or shown on the accompanying drawings be interpreted as illustrative only and not in a limiting sense.

The embodiments of the invention in which an exclusive property or right is claimed are defined as follows:

1. In a system to read-out a preset predetermined flux level stored in a memory core and to reset said core to the same preset predetermined flux level, a system comprising:
   a memory core;
   magnetizing means for presetting said core to said predetermined flux level;
   sensing means for producing a voltage upon a change in flux of said core;
   first means connected across said magnetizing means having a normal first state for establishing said predetermined flux level in said core and having a second state for driving said core toward saturation; and second means for driving said first means from said normal first state to said second state to drive said core toward saturation and, responsive to said sensing means voltage, to maintain said first means in said second state until said core has saturated at which time said first means returns to said normal first state to desaturate said core to said preset predetermined flux level.

2. In a system as defined in claim 1 wherein said second means comprises:

first switch means for initially driving said first means into said second state; and second switch means responsive to the voltage across said sensing means produced by the change in flux of said core while said core is being driven into saturation for maintaining said first means in said second state until said core has saturated.

3. In a system as defined in claim 1 wherein said first means comprises:

a normally saturated second core having an output transformer wound there around;

normally conductive switch means connected to said transformer for saturating said second core when said switch means is conductive; and normally nonconductive switch means connected to said transformer for desaturating said second core when said switch means is conductive.

4. In a system as defined in claim 3 wherein said second means comprises:

first switch means for rendering said normally conductive switch means nonconductive; and second switch means being rendered conductive upon changes in flux in said memory core for rendering said normally nonconductive switch means conductive and for maintAINING said normally nonconductive switch means conductive and said normally conductive switch means nonconductive until said memory core saturates.

5. In a system as defined in claim 1 further comprising means connected between said first and second means for preventing said first means being driven into said second state due to noise and line disturbances.

6. A system as defined in claim 5 wherein said preventing means comprises diode means.

7. In a system as defined in claim 3 wherein said normally conductive switch means comprises first transistor means responsive to the second means for removing the saturating current from the transformer when rendered non-conductive and wherein the normally nonconductive switch means comprises second transistor means responsive to the second means for providing desaturating current to the transformer.

8. In a system as defined in claim 7 wherein said second means comprises:

first switch means for momentarily energizing said first transistor means to thereby remove the saturating current from the transformer when said first switch means is energized; and, second switch means responsive to the voltage of sensing means for rendering said second transistor means conductive and for maintaining said first transistor means energized until said memory core saturates at which time said sensing means no longer has a voltage there across and said first and second transistor means return to their normal states.

9. In a system as defined in claim 8 wherein said second switch means comprises third transistor means including an NPN transistor and an PNP transistor connected between said sensing means and said first and second transistor means.

* * * * *